3,455,684
METHINE DYES FOR OPTICAL SENSITIZATION OF SILVER HALIDES AND PHOTOCONDUCTIVE ZINC OXIDE
Henri Depoorter and Marcel Jan Libeer, Mortsel-Antwerp, Belgium, assignors to Gevaert-Agfa N.V., Mortsel, Belgium, a Belgian company
No Drawing. Filed Oct. 4, 1965, Ser. No. 492,891
Claims priority, application Great Britain, Oct. 12, 1964, 41,484/64
Int. Cl. G03g 7/00; G03c 1/12
U.S. Cl. 96—1.7                                3 Claims

ABSTRACT OF THE DISCLOSURE

Optical sensitizing agents are disclosed which comprise methine dyes of the following general structure:

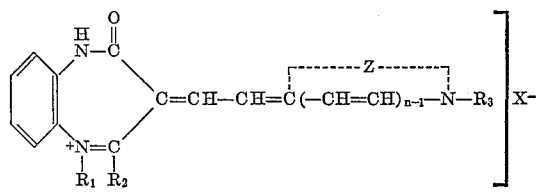

and merocyanine dyes containing a heterocyclic residue according to the following general structure:

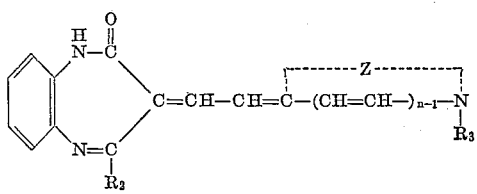

wherein:

$R_1$ and $R_2$ represent hydrogen or alkyl, $R_3$ represents alkyl, $n$ represents the positive integer 1 or 2, Z represents the atoms necessary to complete a heterocyclic nitrogen nucleus containing 5 to 6 atoms in the heterocyclic ring and $X^-$ represents an acid radical.

These optically sensitizing dyes are useful for extending the spectral sensitivity of silver halide photographic emulsions, especially those containing water-permeable colloids such as gelatin or the like.

---

This invention relates to new methine dyes as optically sensitizing agents for light-sensitive silver halide and photoconductive compounds and to light-sensitive materials sensitized therewith.

More particularly the present invention relates to methine dyes containing a diazepinone nucleus and especially to methine dye salts containing linked to a methine group or chain at least one heterocyclic residue according to the following general structure (I):

(I)
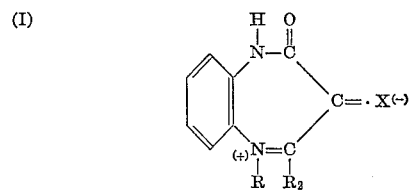

and merocyanine dyes containing a heterocyclic residue according to the following general structure (II):

(II)
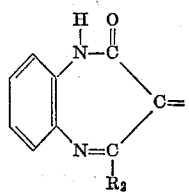

wherein:

$R_1$ represents hydrogen, an alkyl group such as methyl, ethyl, n-propyl, n-butyl, n-amyl, isopropyl, isobutyl, a substituted alkyl radical such as β-hydroxyethyl, β-acetoxyethyl, sulphoethyl, sulphopropyl, sulphobutyl, propyl sulphate or butyl sulphate, an unsaturated aliphatic radical such as allyl, an aralkyl radical such as benzyl, a substituted aralkyl radical such as carboxybenzyl, an aryl radical such as phenyl, a substituted aryl radical such as carboxyphenyl, a cycloalkyl radical such as cyclohexyl; further $R_1$ may also represent a substituted alkyl group such as the group

—A—CO—O—B—SO$_2$—OH wherein A and B each represents a hydrocarbon group as described in the United Kingdom patent specification 886,271, or the group —A—W—NH—V—B, wherein A represents a methylene radical, an ethylene radical, a propylene radical or a butylene radical, B represents an alkyl group, an amino group, a substituted amino group and also a hydrogen atom in the case V is a single bond, and W and V each represents a —CO— radical, a —SO$_2$— radical or a single bond, but at least one of them is a —SO$_2$— radical as described in the United Kingdom patent specification 904,332, $X^-$ represents an acid radical, and $R_2$ represents hydrogen, an alkyl radical, an aralkyl radical or an aryl radical, which radicals may be substituted.

So it is an object of the present invention to provide new methine dye salts represented by the following general Formula III:

(III)
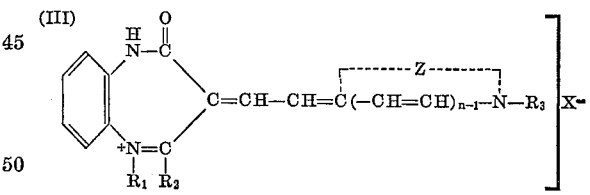

wherein:

$R_1$, $R_2$ and $X^-$ have the same significance as described above, $R_3$ has the same significances as $R_1$, except for hydrogen, $n$ represents a positive integer 1 or 2, and Z represents the atoms necessary to complete a heterocyclic nitrogen nucleus containing 5 to 6 atoms in the heterocyclic ring such as those of the thiazole series (e.g. thiazole, 4-methylthiazole, 4-phenylthiazole, 5-methylthiazole, 5-phenylthiazole, 4,5-dimethylthiazole, 4,5-diphenylthiazole, 4-(2-thienyl)-thiazole), those of the benzothiazole series (e.g. benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 4-phenylbenzothiazole, 5-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, 4,5,6,7-tetrahydrobenzothiazole, 5,6-dimethoxybenzothiazole, 5,6-dioxymethylenebenzothiazole, 5-hydroxybenzothiazole, 6 - hydroxybenzothiazole, 5,6 - dimethylbenzothiazole), those of the naphthothiazole series (e.g. naphtho[2,1-d]thiazole, naphtho[1,2 - d]thiazole, 5 - methoxynaphtho[1,2 - d]thiazole, 5 - ethoxynaphtho[1,2 - d]thiazole 8 - methoxynaphtho[2,1 - d]thiazole, 7 - methoxyynaphtho[2,1-d]thiazole), those of the thionaphtheno[7,6-d]thiazole series (e.g. 7-methoxythionaphtheno[7,6-d]thiazole), those of the oxazole series (e.g. 4-methyloxazole, 5-methyloxazole, 4-phenyloxazole, 4,5-diphenyloxazole, 4-ethyloxazole, 4,5-dimethyloxazole, 5-phenyloxazole), those of the benzoxazole series (e.g. benzoxazole, 5 - chlorobenzoxazole, 5 - methylbenzoxazole, 5-phenylbenzoxazole, 6-methylbenzoxazole, 5,6-dimethylbenzoxazole, 4,6 - dimethylbenzoxazole, 5 - methoxybenzoxazole, 6-methoxybenzoxazole, 5-hydroxybenzoxazole, 6-hydroxybenzoxazole), those of the naphthoxazole series (e.g. naphtho[2,1-d] oxazole, naphtho[1,2-d]oxazole), those of the selenazole series (e.g. 4-methylselenazole, 4-phenylselenazole), those of the benzoselenazole series (e.g. benzoselenazole, 5-chlorobenzoselenazole, 5-methoxybenzoselenazole, 5-hydroxybenzoselenazole, 4,5,6,7-tetrahydrobenzoselenazole) those of the naphthoselenazole series (e.g. naphtho[2,1-d]selenazole, naphtho[1,2-d]selenazole), those of the thiazoline series (e.g. thiazoline, 4-methylthiazoline, 4-hydroxymethyl-4-methylthiazoline, 4,4-bis-hydroxymethylthiazoline, 4-acetoxymethyl-4-methylthiazoline, 4,4-bis-acetoxymethylthiazoline), those of the oxazoline series (e.g. oxazoline, 4 - hydroxymethyl - 4 - methyloxazoline, 4,4-bis-hydroxymethyloxazoline, 4-acetoxymethyl-4-methyloxazoline, 4,4-bis-acetoxymethyloxazoline), those of the selenazoline series (e.g. selenazoline), those of the 2 suinoline series (e.g. the quinoline, 3-methylquinoline, 5-methylquinoline, 7-methylquinoline, 8-methylquinoline, 6-chloroquinoline, 8-chloroquinoline, 6-methoxyquinoline, 6-ethoxyquinoline, 6-hydroxyquinoline, 8-hydroxyquinoline etc.), those of the 4-quinoline series (e.g. quinoline, 6-methoxyquinoline, 7-methylquinoline, 8-methylquinoline), those of the 1-isoquinoline series (e.g. isoquinoline, 3,4-dihydroisoquinoline), those of the 3-isoquinoline series (e.g. isoquinoline), those of the 3,3-dialkylindolenine series (e.g. 3,3-dimethylindolenine, 3,3,5-trimethylindolenine, 3,3,7-trimethylindolenine), those of the pyridine series (e.g. pyridine, 5-methylpyridine), those of the benzimidazole series (e.g. 1-ethylbenzimidazole, 1-phenylbenzimidazole, 1-ethyl-5,6-dichlorobenzimidazole, 1-hydroxyethyl - 5,6 - dichlorobenzimidazole, 1-ethyl-5-chlorobenzimidazole, 1-ethyl-5,6-dibromobenzimidazole, 1-ethyl-5-chloro-6-aminobenzimidazole, 1-ethyl-5-chloro-6-bromobenzimidazole, 1-ethyl-5-phenylbenzimidazole, 1-ethyl-5-fluorobenzimidazole, 1-ethyl-5,6-difluorobenzimidazole, 1-ethyl-5-cyanobenzimidazole, 1-β-acetoxyethyl)-5-cyanobenzimidazole, 1-ethyl-5-chloro-6-cyanobenzimidazole, 1-ethyl-5-fluoro-6-cyanobenzimidazole, 1 - ethyl - 5 - acetylbenzimidazole, 1 - ethyl - 5-chloro-6-fluorobenzimidazole, 1-ethyl-5-carboxybenzimidazole, 1-ethyl-7-carboxybenzimidazole, 1-ethyl-5-carbethoxybenzimidazole, 1-ethyl-7-carbethoxybenzimidazole, 1-ethyl-5-sulphamylbenzimidazole, or 1-ethyl-5-N-ethylsulphamylbenzimidazole).

The methine dyes according to the general Formula III wherein $R_1$ is hydrogen can be prepared by condensing a 2 - oxo - 2,3 - dihydro - 1H - 1,5 - benzodiazepine compound e.g.

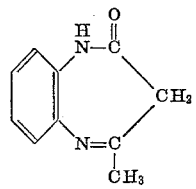

which can be prepared according to Davoll, J. Chem. Soc. (1960) p. 309 and Rossi et al. Helv. Chim. Acta 43 (1960) p. 1298 with a heterocyclic ammonium quaternary salt according to the following general Formula IV:

(IV)   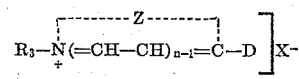

wherein:

$R_3$, Z, $n$ and $X^-$ have the same significance as described above, and

D represents a β-acetanilidovinyl group or a β-p-tolusulphanilidovinyl group.

The condensation of this type can be carried out by allowing the intermediates to react in the presence of an inert solvent such as methanol, ethanol, diethyl ether, acetone, 1,4-dioxane, if needed, whilst heating.

A further object of the present invention is to provide new merocyanine dyes represented by the following general Formula V:

(V)

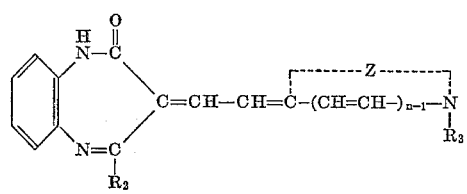

wherein $R_3$, $R_2$, Z and $n$ have the same significance as described above.

These merocyanine dyes or non-ionoid methine dyes can be prepared by treating the corresponding methine dye salts with alkali.

The methine dyes according to the general Formula III wherein $R_1$ is different from hydrogen can be prepared by treating the merocyanine dyes of Formula V with alkylating agents, e.g. alkylhalogenides such as methylbromides or methyliodides, alkyl arylsulphonates such as p-toluene sulphonic acid methyl ester, aralkylsulphates such as dimethylsulphates.

The following examples illustrate the preparation of methine dyes according to the present invention.

Example 1.—2-oxo-3-[2-3-ethyl-2-benzothiazolinylidene)-ethylidene] - 4 - methyl - 2,3 - dihydro - 1H - 1,5 - benzodiazepine-hydroiodide

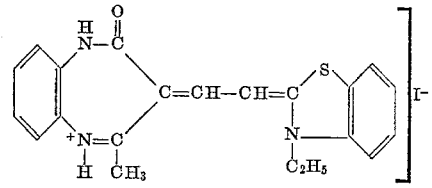

1.4 g. (0.008 mole) of 4-methyl-2-oxo-2,3-dihydro-1H-1,5-benzodiazepine and 3.7 g. (0.008 mole) of 2-(β-acetanilidovinyl)-3-ethylbenzothiazolium iodide are dissolved in 30 ccs. of ethylene glycol monomethyl ether and boiled for 5 minutes. The dye partially precipitates during the reaction. The crude dye is purified by recrystallising twice from ethylene glycol monomethyl ether. Yield: 0.5 g. Melting point: >250° C. Absorption maximum: 524 nm. $\epsilon = 1.32 \cdot 10^5$.

A gelatino silver bromoiodide emulsion containing per kg. 30 mg. of said dyestuff, is sensitized with a maximum near 560 nm.

Example 2.—2-oxo-3-[2-(3-ethyl-2-benzoxazolinylidene)-ethylidene] - 4 - methyl - 2,3 - dihydro - 1H - 1,5 - benzodiazepine-hydroiodide

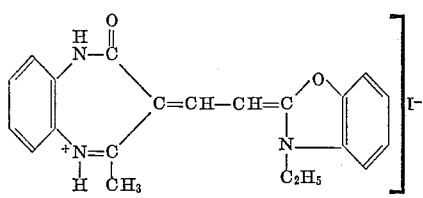

3.48 g. (0.02 mole) of 4-methyl-2-oxo-2,3-dihydro-1H-1,5-benzodiazepine and 8.68 g. (0.02 mole) of 2-(β-acetanilidovinyl) - 3 - ethyl - benzoxazolium iodide are dissolved in 75 ccs. of ethylene glycol monomethyl ether and boiled for 10 minutes. The dye partially precipitates during the reaction. The crude dye is purified by dissolving in ethylene glycol monomethyl ether and precipitating with a 5% potassium iodide solution in water. Yield after two purifications: 1.4 g. Melting point: >250° C. Absorption maximum: 488 nm. $\epsilon = 1.27 \cdot 10^5$.

Example 3.—2 - oxo - 3 - [2 - (3 - ethyl - 2 - thiazolidinylidene) - ethylidene] - 4 - methyl - 2,3 - dihydro - 1H-1,5-benzodiazepine hydrobromide

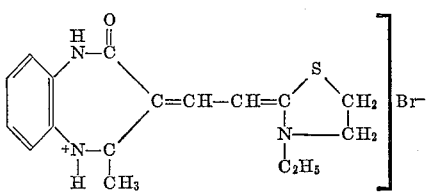

3.48 g. (0.02 mole) of 4-methyl-2-oxo-2,3-dihydro-1H-1,5-benzodiazepine and 6.26 g. (0.02 mole) of 2-(β-anilinovinyl)-3-ethyl-2-thiazolinium bromide suspended in 30 ccs. of acetic anhydride are boiled for 6 hours on an oil bath at 110 to 115° C. The dye precipitates and is purified by recrystallising twice from methanol. Yield: 0.35 g. Melting point: >250° C. Absorption maximum: 470 nm. $\epsilon = 7.94 \cdot 10^4$.

A gelatino silver chloride emulsion containing per kg. 20 mg. of said dyestuff is sensitized with a maximum near 510 nm.

Example 4.—2 - oxo - 3 - [2 - (3 - ethyl - 2 - benzothiazolinylidene) - ethylidene] - 4 - methyl - 2,3 - dihydro-1H-1,5-benzodiazepine

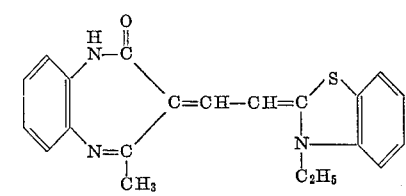

15 ccs. of a 10% sodium hydroxide solution in ethanol are added to 4.4 g. (0.009 mole) of the dye prepared according to Example 1, suspended in 100 ccs. of ethanol. The dye dissolves and next precipitates again. Yield after 2 recrystallisations from ethylene glycol monomethyl ether: 1.6 g. Melting point: >250° C. Absorption maximum: 460 nm. $\epsilon = 6.16 \cdot 10^4$.

A gelatino silver bromide emulsion containing per kg. 20 mg. of said dyestuff is sensitized with a maximum near 560 nm.

Example 5.—2 - oxo - 3 - [2 - (3 - ethyl - 2 - benzoxazolinylidene) - ethylidene] - 4 - methyl - 2,3 - dihydro-1H-1,5-benzodiazepine

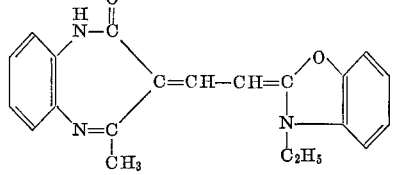

3.6 g. (0.008 mole) of the dye prepared according to Example 2 is treated as in Example 4. After recrystallisation from ethanol/water/isopropanol, 0.8 g. of product melting at 220° C. is obtained. Absorption maximum: 445 nm.

Example 6.—2 - oxo - 3 - [2 - (3 - ethyl - 2 - thiazolidinylidene) - ethylidene] - 4 - methyl - 2,3 - dihydro-1H-1,5-benzodiazepine

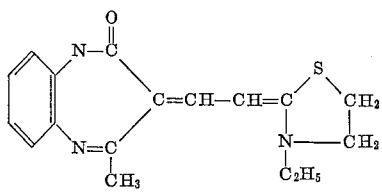

1 g. (0.0025 mole) of the dye prepared according to Example 3 is treated as in Example 4. After recrystallising twice from methanol, 0.5 g. of product melting at 217° C. is obtained. Absorption maximum: 425 nm. $\epsilon = 4.46 \cdot 10^4$.

Example 7.—2 - oxo - 3 - [2 - (3 - ethyl - 2 - benzothiazolinylidene) - ethylidene] - 4,5 - dimethyl - 2,3 - dihydro-1H-1,5-benzodiazepinium-methyl sulphate

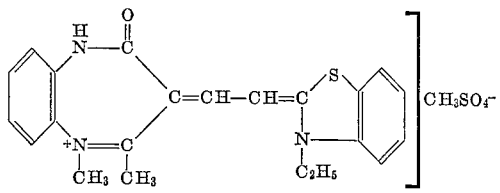

4.2 g. (0.012 mole) of the dye prepared according to Example 4 are suspended in 50 ccs. of anhydrous benzene. 1.65 g. (0.013 mole) of dimethyl sulphate are added. The resulting mixture is heated for 90 minutes on a boiling water bath. The precipitate is recrystallised twice from ethylene glycol monomethyl ether. Yield: 1 g. Melting point: >250° C. Absorption maximum: 515 nm.

$$\epsilon = 1.15 \cdot 10^5$$

A gelatino silver bromo-iodide emulsion containing per kg. 30 mg. of said dyestuff is sensitized with a maximum near 550 nm.

As appears from the examples the new methine dyes are useful for extending the spectral sensitivity of silver halide photographic emulsions, especially of the customarily employed gelatino silver chloride, gelatino silver chlorobromide, gelatino silver bromide, gelatino silver bromoiodide and gelatino silver chloro-bromo-iodide emulsions. Photographic emulsions containing water-permeable colloids other than gelatin, such as agar-agar, zein, collodion, water-soluble cellulose derivatives, poly(vinyl alcohol) or other hydrophilic synthetic or natural resins or polymeric compounds, can, however, also be sensitized with the methine dyes according to the present invention.

In order to prepare photographic emulsions sensitized according to this invention by one or more of the new methine dyes, the methine dyes are incorporated in the photographic emulsion by one of the methods customarily employed in the art. In practice, it is convenient to add the dyes to the emulsion in the form of a solution in an appropriate solvent. The new methine dyes can be added at any stage of the preparation of the emulsion and should be uniformly distributed throughout the emulsion. The concentration of the dyes in the emulsion may vary widely, for example from 1 to 200 mg. per kg. of flowable emulsion and will vary according to the effect desired. The suitable and most economical concentration for any particular emulsion will be apparent to those skilled in the art, upon making the ordinary tests and observations customarily used in the art of emulsion making.

The new methine dyes can be incorporated into photographic emulsions the general sensitivity of which has been increased by physical and chemical ripening. As suitable chemical sensitizers may be mentioned the well-known sulphur sensitizers such as allyl isothiocyanate, allylthiourea, sodium thiosulphate, potassium selenocyanide, the natural sensitizers originating in the gelatin, the reducing sensitizers such as imino-aminomethane sulphinic acid and the derivatives thereof, further cadmium salts, and the salts of noble metals such as gold, platinum and palladium.

In preparing the photographic emulsions according to the invention, the usual and suitable addenda such as antifogging agents, stabilizers, antibronzing agents, hardeners, wetting agents, plasticizers, development accelerators, colour couplers, fluorescent brighteners and ultra-violet screening compounds can moreover be incorporated in the emulsion in the manner customarily employed in the art. In this respect it may as well be mentioned that the sensitivity of the silver halide emulsions sensitized according to the process of the present invention is not adversely affected but rather enchanced by the presence therein of certain fluorescent compounds. Another advantage of the process for sensitizing silver halide emulsions according to the present invention is the compatibility of the new methine dyes with anionic wetting agents and with colour couplers, which is of great importance in the application of the new methine dyes for sensitizing the silver halide emulsions of a light-sensitive element for colour photography.

The photographic emulsions optically sensitized according to the invention may further be supersensitized and/or hypersensitized by one of the methods known to those skilled in the art.

Emulsions sensitized with the new methine dyes can be coated in the usual manner on a suitable support such as glass, cellulose derivative film, resin film or paper.

Although the methine dyes according to the present invention are especially useful for extending the spectral sensitivity of silver halide emulsions, the methine dyes according to this invention also possess optical sensitizing properties for photoconductve compounds e.g. photoconductive zinc oxide.

The new methine dyes according to this invention can be incorporated in the photoconductive layer by one of the methods customarily employed in the art.

The methine dyes according to this invention are incorporated preferably in a photoconductive layer such as a photoconductive layer containing photoconductive zinc oxide, in an amount of 0.05 to 0.1 mole percent in respect of the photoconductive substance.

The following sensitization values are obtained from a photoconductive zinc oxide layer containing per mole of photoconductive zinc oxide 0.1 mole of dyestuff as indicated in the table.

TABLE

| Dyestuff according to example | Relative sensitivity | Sensitization maximum (nm.) |
|---|---|---|
| Non-sensitized zinc oxide | 100 | |
| 1 | 425 | 535 |
| 2 | 225 | 540 |
| 3 | 675 | 472 |
| 4 | 1,400 | 470 |
| 5 | 250 | 500 |
| 6 | 400 | 470 |

What we claim is:

1. A light-sensitive element containing light-sensitive silver halide optically sensitized with a methine dye having a general formula selected from the group consisting of

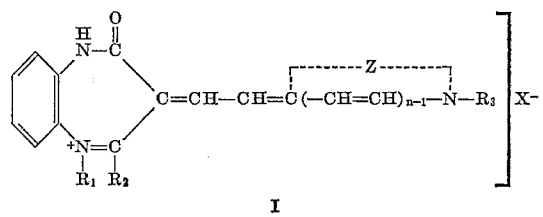

I and

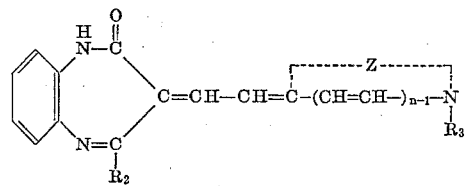

II wherein:
$R_1$ is selected from the group consisting of a hydrogen atom and a lower alkyl radical,
$R_2$ and $R_3$ represent lower alkyl radicals,
Z represents the atoms necessary to complete a heterocyclic nucleus containing 5 to 6 atoms in the heterocyclic ring,
$n$ is a positive integer selected from the group consisting of 1 and 2, and
$X^-$ is an acid radical of the type used in methine dye salts.

2. A light sensitive element containing photoconductive zinc oxide optically sensitized with a methine dye having a general formula selected from the group consisting of:

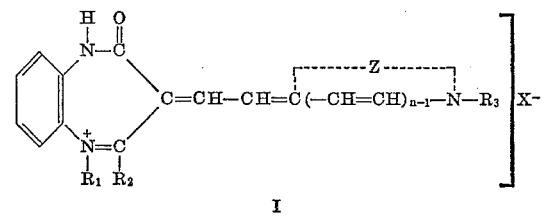

I and

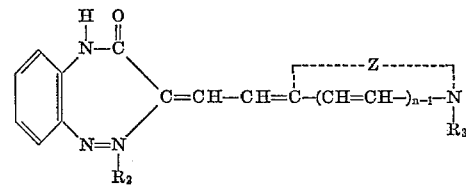

II wherein:
$R_1$ is selected from the group consisting of a hydrogen atom and a lower alkyl radical,
$R_2$ and $R_3$ represent lower alkyl radicals,
Z represents the atoms necessary to complete a heterocyclic nucleus containing 5 or 6 atoms in the heterocyclic ring, $n$ is a positive integer selected from the group consisting of 1 and 2, and $X^-$ is an acid radical of the type used in methine dye salts.

3. A photographic light-sensitive silver halide emulsion containing a methine dye salt having a general formula according to Formula I of claim 1.

References Cited

Chemical Abstracts, vol. 53, 1959.

NORMAN G. TORCHIN, Primary Examiner

J. C. COOPER III, Assistant Examiner

U.S. Cl. X.R.

96—1.8, 102, 106; 260—240.4